(12) United States Patent
Li

(10) Patent No.: US 10,300,571 B2
(45) Date of Patent: May 28, 2019

(54) INTELLECTUAL AUTOMATIC TOOL CHANGER SPEED MODERATING SYSTEM

(71) Applicant: POJU INTERNATIONAL CO., LTD, Taichung (TW)

(72) Inventor: Shuang-Yu Li, Taichung (TW)

(73) Assignee: POJU INTERNATIONAL CO., LTD, Taichung (TW)

( * ) Notice: Subject to any disclaimer, the term of this patent is extended or adjusted under 35 U.S.C. 154(b) by 122 days.

(21) Appl. No.: 15/618,035

(22) Filed: Jun. 8, 2017

(65) Prior Publication Data
US 2018/0354085 A1    Dec. 13, 2018

(51) Int. Cl.
*B23Q 3/157* (2006.01)
*B23Q 17/24* (2006.01)
*G05B 19/418* (2006.01)

(52) U.S. Cl.
CPC ...... *B23Q 3/15722* (2016.11); *B23Q 17/2457* (2013.01); *B23Q 17/2461* (2013.01); *B23Q 17/2466* (2013.01); *G05B 19/4187* (2013.01); *G05B 2219/50249* (2013.01); *G05B 2219/50264* (2013.01); *Y10T 483/12* (2015.01); *Y10T 483/136* (2015.01)

(58) Field of Classification Search
CPC .... Y10T 483/11; Y10T 483/12; Y10T 483/13; Y10T 483/136; B23Q 17/09; B23Q 17/0904; B23Q 17/2457; B23Q 17/2461; B23Q 17/2466

See application file for complete search history.

(56) References Cited

U.S. PATENT DOCUMENTS

| 4,616,322 | A | * | 10/1986 | Niwa | G05B 19/4065 483/4 |
| 5,568,028 | A | * | 10/1996 | Uchiyama | G05B 19/4065 318/433 |
| 6,260,427 | B1 | * | 7/2001 | Jones | G01N 3/58 73/865.9 |
| 6,665,580 | B1 | * | 12/2003 | Susnjara | G05B 19/404 318/568.1 |
| 2010/0145498 | A1 | * | 6/2010 | Uchikawa | B23Q 3/15733 700/179 |

(Continued)

FOREIGN PATENT DOCUMENTS

| DE | 102013218536 A1 | * | 3/2015 | ......... B23Q 17/0919 |
| JP | 01164539 A | * | 6/1989 | ......... B23Q 17/2457 |

OTHER PUBLICATIONS

English translation of DE-102013218536-A1 (Year: 2015).*

*Primary Examiner* — Daniel W Howell
*Assistant Examiner* — Yasir A Diab
(74) *Attorney, Agent, or Firm* — WPAT, PC

(57) ABSTRACT

An intellectual automatic tool changer (ATC) speed moderating system, which is disposed between a tool magazine and a tool exchanging arm, includes an image capture device for capturing the image of tools, and a processing device connected with the image capturing device. The processing device includes a receiving module for receiving the images of tools, a calculating module for calculating an assessment value of a tool according to the image of the tool, and a signal transmitting module connected with a controller of the tool exchanging arm for transmitting the assessment value of the tool to the controller. Therefore, the tool changing speed of the tool changing arm is controlled and moderated.

9 Claims, 4 Drawing Sheets

(56) References Cited

U.S. PATENT DOCUMENTS

| | | | |
|---|---|---|---|
| 2013/0090755 A1* | 4/2013 | Kiryu | B23Q 17/20 |
| | | | 700/186 |
| 2015/0072844 A1* | 3/2015 | Murota | B23Q 3/15526 |
| | | | 483/7 |
| 2015/0266153 A1* | 9/2015 | Kanehira | B23Q 11/08 |
| | | | 483/10 |
| 2016/0303697 A1* | 10/2016 | Isobe | B23Q 17/005 |

* cited by examiner

INTELLECTUAL AUTOMATIC TOOL CHANGER SPEED MODERATING SYSTEM

BACKGROUND OF THE INVENTION

1. Field of the Invention

The present invention relates to detection systems, and more particularly, to an intellectual automatic tool changer (ATC) speed moderating system, which calculates an assessment value based on the center of gravity and weight of the tool and accordingly moderates the tool changing speed.

2. Description of the Related Art

Tool machine is an important processing machine in the machinery industry. Regarding a CNC tool machine, the motor of an ATC structure is controlled by a programmable logic controller (PLC), so as to driving the tool magazine to conduct a tool storing or tool changing operation. Also, by use of the PLC controlling, different processing requirements are realized, such as milling, drilling, boring, and tapping. Therefore, the processing duration is greatly shortened, thus lowering the manufacturing cost.

However, when the tool changing structure is controlled by the PLC to conduct the tool changing operation, a heavier tool causes a greater inertia after the tool changing arm finishes clamping the tool. During the tool changing process, a faster tool changing speed causes a tool swaying situation much easily. To avoid such situation, the user needs to set up a proper tool changing speed on the PLC based on the weight of the tool. When another different tool is to be replaced on the tool machine, the user needs to set up a new tool changing speed according to the weight of the new tool. As a result, the processing operation is time costing and inefficient. Or, the tool changing speed is set up based on the weight of the heaviest tool among all the tools, thus wasting operation efficiency.

Further, for avoiding a repeating speed setting process on the PLC, the user may divide the different weights of the tools into two weight range groups, such as a normal weight group and a heavy weight group, such that the PLC is allowed to control the tool changing speed based on the two weight ranges. Whenever the weight of the to-be-installed tool falls in the normal weight range or the heavy weight range, the PLC controls the tool changing speed at the lowest speed which belongs to the certain weight range, thereby avoiding the tool swaying situation and the averting the repeating setting processes for different tools. However, conducting the tool changing operations by only two tool changing speeds and changing the tools at the lowest speed are still unable to improve the processing efficiency. Therefore, it is desirable to improve the disadvantages regarding the tool changing speed and steps, so as to improve the tool changing speed and processing efficiency.

SUMMARY OF THE INVENTION

For improving the issues above, an intellectual automatic tool changer (ATC) speed moderating system is disclosed. By capturing the images of tools by the image capturing device and calculating an assessment value based on the center of gravity and the weight of tools by the calculating module, and further applying a program which is connected with the ATC server motor, different rotational tool changing speed of the ATC are intellectually provided according to different weights and center of gravity of different tools. Therefore, the manual setting step is saved, so as to improve the tool changing efficiency. Also, providing a proper tool changing speed according to different tools, the processing efficiency is improve, and the tool swaying situation is prevented.

For achieving the aforementioned objectives, an intellectual automatic tool changer (ATC) speed moderating system in accordance with the present invention is provided, which is disposed between a tool magazine and a tool changing arm, wherein the tool magazine is provided with a plurality of tools. The intellectual automatic tool changer (ATC) speed moderating system comprises:

an image capturing device capturing an image of a tool; and a processing device signally connected with the image capturing device, the processing device further including a receiving module, a calculating module, and a signal transmitting module, the receiving module receiving the image, the calculating module calculating a center of gravity and a weight of the tool, the signal transmitting module connected with a controller of the tool changing arm and transmitting the center of gravity and the weight of the tool to the controller of the tool changing arm, such that a tool changing speed of the tool changing arm is controlled and moderated by the controller.

Preferably, the image of the tool includes information such as the depth, the width, and the length of the tool.

Preferably, the calculating module calculates the weight of the tool based on the information of the image and the predetermined density of the tool.

Preferably, the calculating module calculates the center of gravity of the tool based on the weight of the tool.

With such configuration, the image capturing device captures the image of the tool, with the calculating module then calculating an assessment value of the tool based on the image, by which the center of gravity and the weight of the tool are acquired. Subsequently, the signal transmitting module transmits the calculated assessment value to the controller of the tool changing arm, such that the proper tool changing speed for the target tool is exported for conducting the tool changing operation according to the weight and the center of gravity of the tool. The tool changing operation is conducted at the appropriate speed, thus improving the tool changing efficiency issue occurring during a two-speed tool changing method. Also, the tool swaying situation is prevented, thereby improving the operational environment safety.

Furthermore, by automatically calculating the weight and the center of gravity of the tool, the manual setting and measuring steps and the time cost thereof are saved, thus improving the overall operational efficiency.

DETAILED DESCRIPTION OF THE INVENTION

Figure 1:
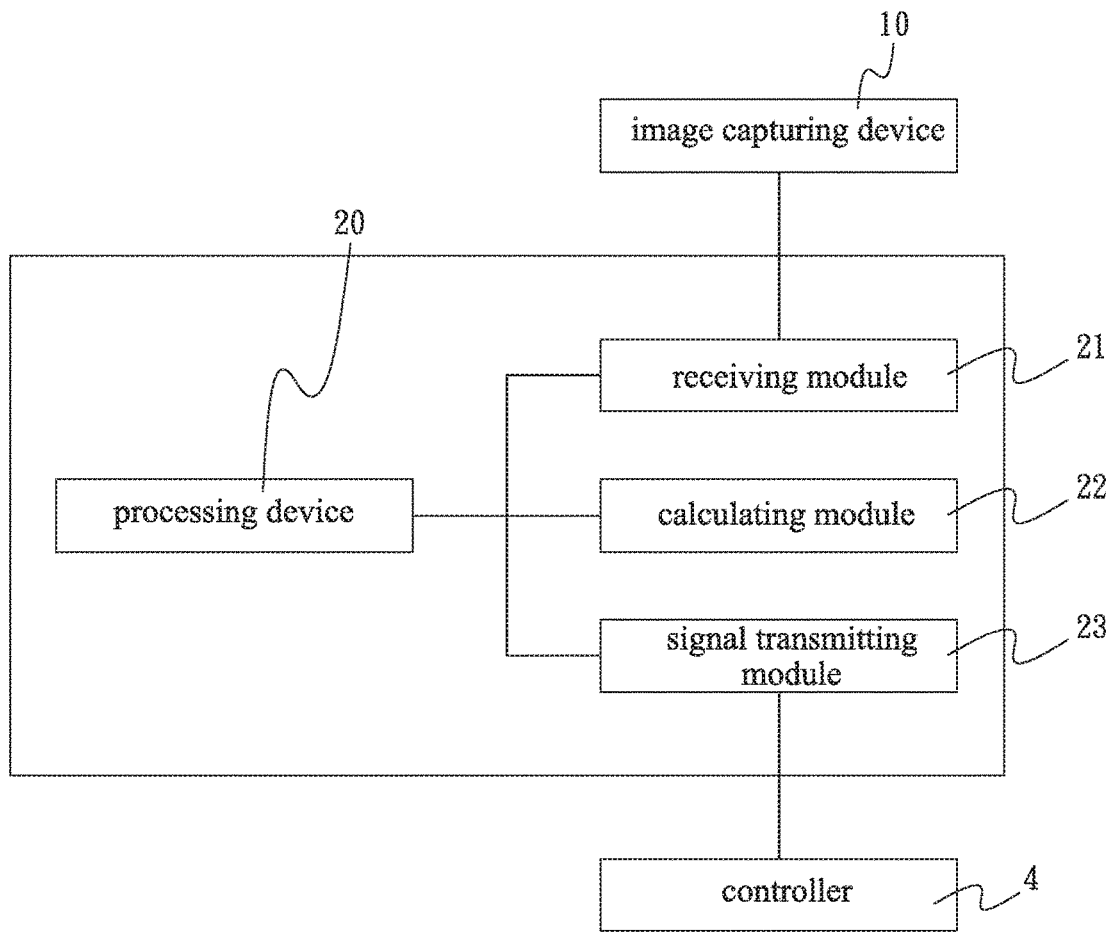
FIG. 1 is a schematic view illustrating the structure of the intellectual automatic tool changer (ATC) speed moderating system in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 4, an intellectual automatic tool changer (ATC) speed moderating system 100 in accordance with an embodiment of the present invention is disposed between a tool magazine 1 and a tool changing arm 2, wherein the tool magazine 1 is provided with a plurality of tools 3. The intellectual automatic tool changer speed moderating system 100 comprises an image capturing device 10 and a processing device 20.

The image capturing device 10 is disposed between the tool magazine 1 and the tool changing arm 2 for capturing an image 11 of each tool 3, wherein the image 11 includes various information of the tool 3, including the depth, the width, or the length thereof. In an embodiment of the present invention, the image capturing device 10 refers to a video recording device or a camera device.

The processing device 20 is signally connected with the image capturing device 10. The processing device 20 refers to a computer terminal. The processing device 20 and the image capturing device 10 are allowed to be connected in a manner of wired signal communication of a wireless signal communication.

The processing device 20 includes a receiving module 21, a calculating module 22, and a signal transmitting module 23 signally connected with a controller 4 of the tool changing arm 2. The signal transmitting module 23 and the controller 4 of the tool changing arm 2 are allowed to be connected in a manner of wired signal communication or a wireless signal communication. In an embodiment of the present invention, the controller 4 of the tool changing arm 2 refers to a programmable controller.

Further, the receiving module 21 is applied for receiving the image 11 captured by the image capturing device 10. According to the image 11 which includes the depth, the width, and the length of the tool 3 and a predetermined density of the tool 3, the calculating module 22 calculates to determine an assessment value of the tool 3, wherein the assessment value refers to a product of a gravity distance of the tool 3 multiplied by the weight of the tool 3, wherein the gravity distance refers to the distance from the position of the tool 3 clamped by the tool changing arm 2 to the center of gravity of the tool 3. Due to the fact that the tools 3 applied by the tool machine are formed of identical materials, the density of the tools 3 are allowed to be predetermined. The assessment value of the tool 3 is transmitted to the controller 4 of the tool changing arm 2 through the signal transmitting module 23, such that the tool changing speed of the tool changing arm 2 is accordingly under control and moderated. Therefore, the present invention is able to provided different tool changing speeds for tools having different weight and center of gravity. For example, regarding a tool A and a tool B, when the calculating module 22 calculates and determines that the assessment value of the weight of tool A is larger than the corresponding assessment value of tool B, it is revealed that tool A shall be changed at a relatively lower tool changing speed, while tool B is allowed to be changed at a relatively higher tool changing speed. Therefore, according to the weight and the center of gravity of the tool 3, an appropriate tool changing speed is applied, so as to improve the tool changing efficiency.

Figure 2:
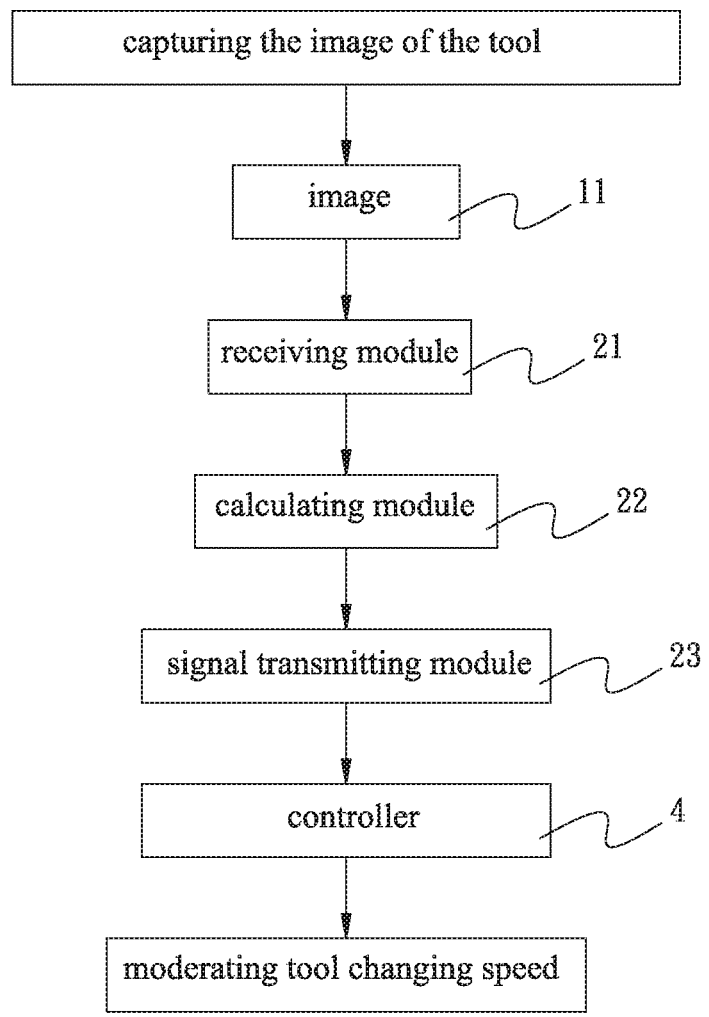
FIG. 2 is flow chart of the intellectual automatic tool changer speed moderating process of the system in accordance with an embodiment of the present invention.
Figure 3:
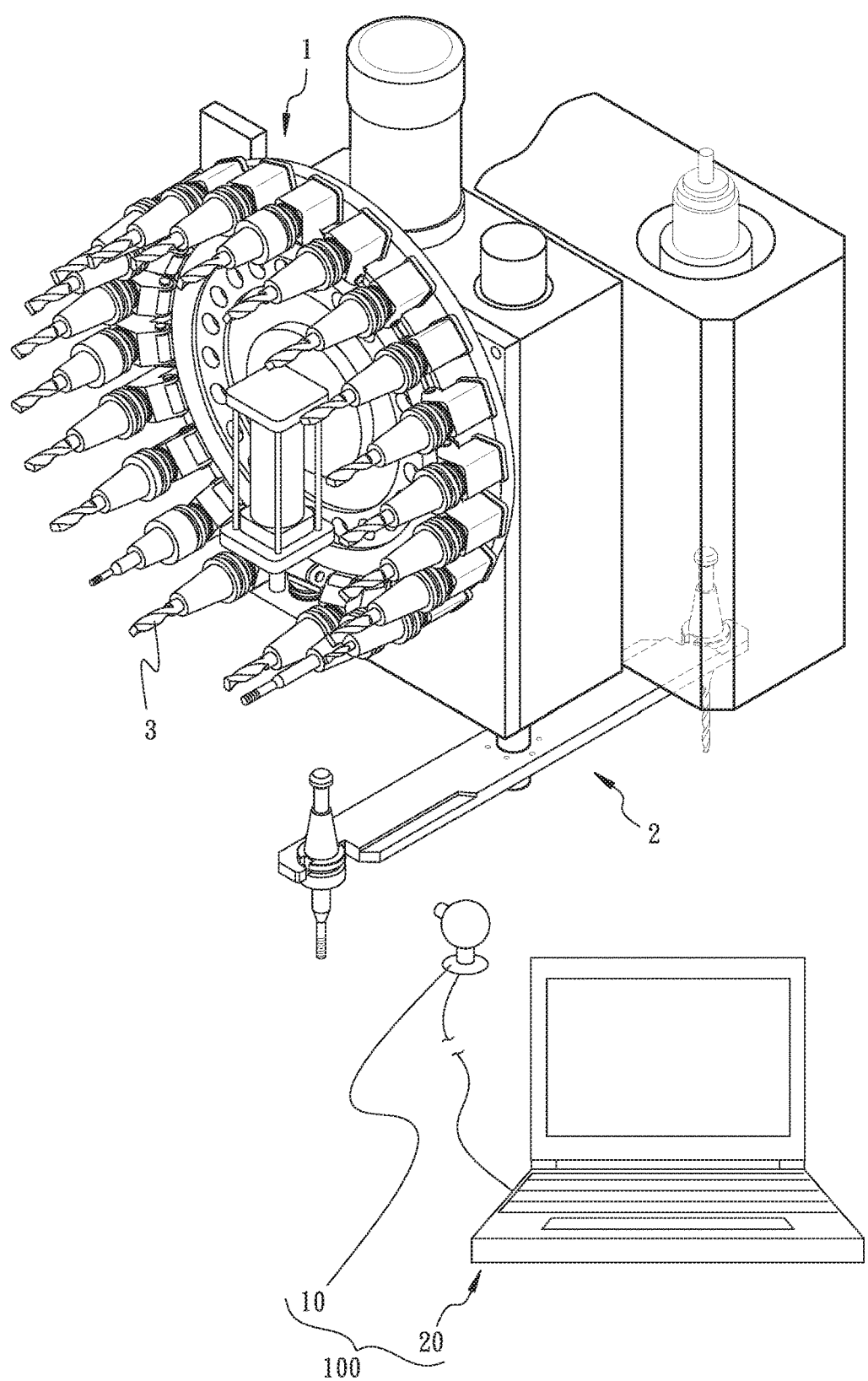
FIG. 3 is a schematic view illustrating that the image capturing device is disposed between the tool magazine and the tool changing arm.
Figure 4:
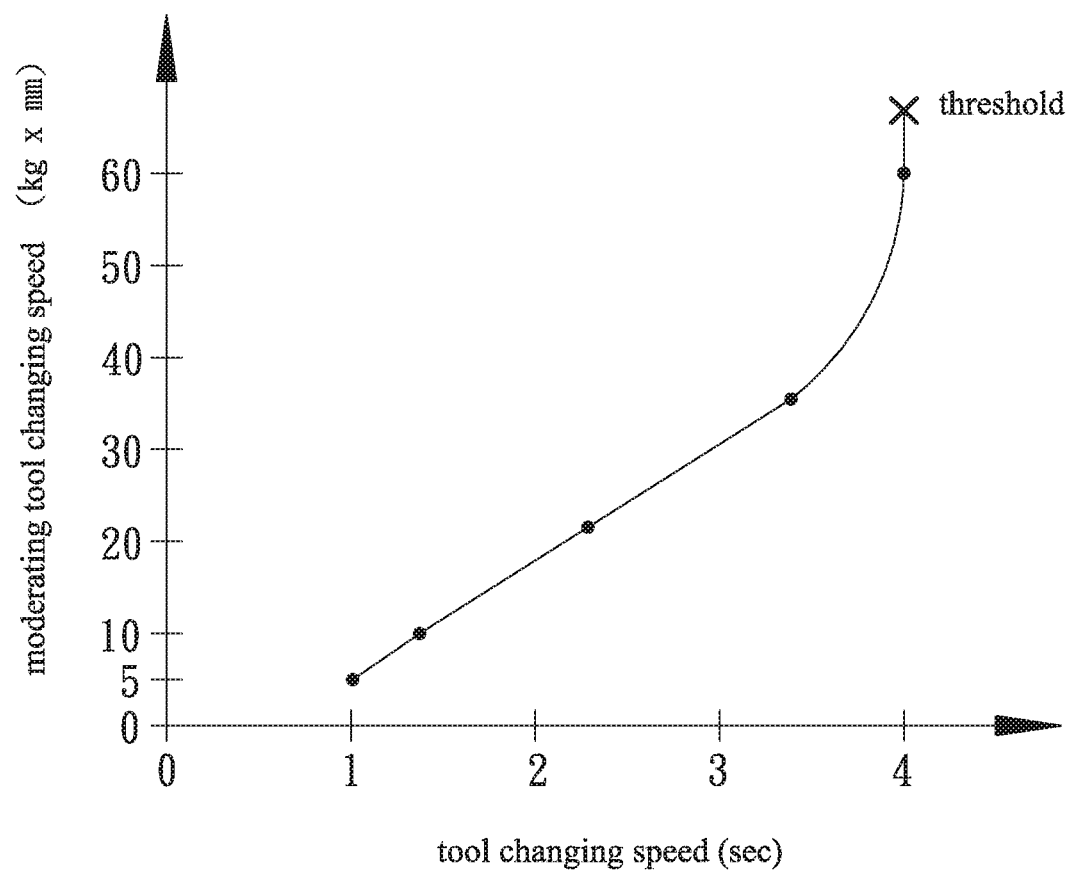
FIG. 4 is a diagram illustrating the curve line representing the relationship between the tool changing time (seconds) of the tool and an assessment value of the tool, wherein the assessment value is the product value of the distance from the clamping position to the center of gravity of the tool multiplied by the weight of the tool (kg×mm).

Referring to FIG. 2 to FIG. 4, prior to the tool changing operation, the image capturing device 10 captures the image 11 of the tool 3, and the image 11 is then transmitted to the receiving module 21. The calculating module 22 calculates the assessment value of the tool 3 based on the information of the image 11. Next, the signal transmitting module 23 transmits the assessment value which is acquired by multiplying the gravity distance and the weight of the tool 3 to the controller 4 of the tool changing arm 2, such that a proper tool changing speed for the tool 3 is set up. When the product value of the gravity distance multiplied by the weight of the tool 3 is larger, the tool changing time needed for the tool 3 is longer. In an embodiment of the present invention, the maximum tool changing time duration is 4 seconds. When the tool changing time duration reaches 4 second, the duration of the tool changing time stops increasing along with the product value.

With such configuration, by use of the intellectual detection operation, the center of gravity and the weight of the tool 3 are determined, and a proper tool changing speed is accordingly applied for preventing the situation of tool swaying, thus improve the operational environment safety. Also, the tool changing efficiency is improved, so as to save the manual operation time demand and increase the overall processing efficiency.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An intellectual automatic tool changer (ATC) speed moderating system, disposed between a tool magazine and a tool changing arm, wherein the tool magazine is provided with a plurality of tools, the intellectual automatic tool changer speed moderating system comprising:

an image capturing device capturing an image of one of the tools; and a processing device signally connected with the image capturing device, the processing device further including a receiving module, a calculating module, and a signal transmitting module, the receiving module receiving the image captured by the image capturing device, the calculating module calculating a center of gravity and a weight of the tool based on the image of the tool, the calculating module subsequently calculating an assessment value of the tool, wherein the assessment value is a product value of a gravity distance multiplied by the weight of the tool, wherein the gravity distance is a distance from a position of the tool clamped by the tool changing arm to the center of gravity of the tool, the signal transmitting module connected with a controller of the tool changing arm and transmitting the assessment value of the tool to the controller of the tool changing arm, such that a tool changing speed of the tool changing arm is controlled and moderated according to the assessment value of the tool.

2. The system of claim 1, wherein the image of the tool comprises various information of the tool including a depth, a width, and a length of the tool.

3. The system of claim 1, wherein the calculating module calculates a weight of the tool according to the image of the tool and a predetermined density of the tool.

4. The system of claim 3, wherein the calculating module calculates the center of gravity according to the weight of the tool.

5. The system of claim 1, wherein the processing device and the image capturing device are connected in at least a manner selected from the group consisting of wired signal communication and wireless signal communication.

6. The system of claim 1, wherein the signal transmitting module and the controller of the tool changing arm are connected in at least a manner selected from the group consisting of wired signal communication and wireless signal communication.

7. The system of claim 1, wherein the controller of the tool changing arm refers to a programmable controller.

8. The system of claim 1, wherein the image capturing module refers to at least one of the group consisting of a video recording device and a camera device.

9. The system of claim 1, wherein the processing device refers to a computer terminal.

\* \* \* \* \*